US012578621B2

(12) United States Patent
Chen et al.

(10) Patent No.: US 12,578,621 B2
(45) Date of Patent: Mar. 17, 2026

(54) OPTICAL SYSTEM

(71) Applicant: TDK CORPORATION, Tokyo (JP)

(72) Inventors: Yi-Ho Chen, Taoyuan City (TW);
Shu-Shan Chen, Taoyuan City (TW);
Ko-Lun Chao, Taoyuan City (TW);
Pai-Jui Cheng, Taoyuan City (TW)

(73) Assignee: TDK CORPORATION, Tokyo (JP)

( * ) Notice: Subject to any disclaimer, the term of this
patent is extended or adjusted under 35
U.S.C. 154(b) by 189 days.

(21) Appl. No.: 18/365,792

(22) Filed: Aug. 4, 2023

(65) Prior Publication Data

US 2024/0045225 A1 Feb. 8, 2024

Related U.S. Application Data

(60) Provisional application No. 63/395,607, filed on Aug.
5, 2022.

(51) Int. Cl.
*G03B 5/00* (2021.01)
*G02B 7/00* (2021.01)
(52) U.S. Cl.
CPC ............... *G03B 5/00* (2013.01); *G02B 7/005*
(2013.01)

(58) Field of Classification Search
CPC ........ G03B 37/00; G03B 37/02; G03B 30/00;
G03B 5/00; G03B 5/06; G03B 5/08;
G03B 2205/0053; G03B 2205/0061;
G02B 7/00; G02B 7/003; G02B 7/005;
G02B 7/023; G02B 27/646; G02B
27/648; G02B 6/3564; G02B 6/3566;
G02B 6/3578
See application file for complete search history.

(56) References Cited

U.S. PATENT DOCUMENTS

2021/0173175 A1* 6/2021 Itagaki ................. G02B 27/646

* cited by examiner

*Primary Examiner* — Stephanie E Bloss
*Assistant Examiner* — Fang-Chi Chang
(74) *Attorney, Agent, or Firm* — MUNCY, GEISSLER,
OLDS & LOWE, P.C.

(57) ABSTRACT

An optical system is provided, including a movable portion,
a fixed portion, and a driving assembly. The movable portion
is connected to an optical module. The movable portion is
movable relative to the fixed portion. The driving assembly
drives the movable portion to move relative to the fixed
portion. The driving assembly is in contact with the movable
portion.

16 Claims, 6 Drawing Sheets

1001

1002

OPTICAL SYSTEM

CROSS REFERENCE TO RELATED APPLICATIONS

This application claims the benefit of U.S. Provisional Application No. 63/395,607, filed on Aug. 5, 2022, the entirety of which is incorporated by reference herein.

BACKGROUND OF THE INVENTION

Field of the Invention

The present disclosure relates to an optical system, and more particularly to an optical system that includes a piezoelectric driving assembly.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable that they have optical qualities that are better and more stable, offering consumers more choice.

Electronic devices that have image-capturing or video-recording functions normally include lenses or optical modules of fixed types. The fixed optical modules are limited by predetermined angles and cannot achieve image-capturing or video-recording functions with wider angles. Elements toward the edges of the frame would also appear distorted when using traditional wide-angle lenses As a result, the present disclosure provides an optical system that is different from the prior art, to broaden the shooting angle using only one single lens and to improve image quality as well.

BRIEF SUMMARY OF THE INVENTION

An optical system is provided in the present disclosure, including a movable portion, a fixed portion, and a driving assembly. The movable portion is connected to an optical module. The movable portion is movable relative to the fixed portion. The driving assembly drives the movable portion to move relative to the fixed portion. The driving assembly is in contact with the movable portion.

In some embodiments of the present disclosure, the driving assembly includes a piezoelectric element, a transmission member, and a contact member. The piezoelectric element is disposed at the fixed portion. The transmission member is connected to the piezoelectric element. The transmission member transmits a power that is output by the piezoelectric element. The contact member is connected to the transmission member. The contact member is movable relative to the piezoelectric element.

In some embodiments of the present disclosure, the contact member is movable relative to the movable portion.

In some embodiments of the present disclosure, the contact member is in direct contact with the movable portion, providing a driving force to the movable portion.

In some embodiments of the present disclosure, the contact member has a rod structure.

In some embodiments of the present disclosure, the optical system further includes a support assembly that is connected to the movable portion and to an external circuit. The support assembly includes a first resilient element. The first resilient element includes a resilient cantilever that has an elastic structure. The first resilient element is connected to the optical module.

In some embodiments of the present disclosure, the first resilient element is a circuit assembly. The optical module is electrically connected to the external circuit via the first resilient element.

In some embodiments of the present disclosure, the support assembly further includes a second resilient element. The second resilient element is connected to the movable portion and to the fixed portion. The first resilient element provides a first preload to the movable portion. The second resilient element provides a second preload to the movable portion. The direction of the second preload is perpendicular to the moving direction of the movable portion.

In some embodiments of the present disclosure, the support assembly further includes a second resilient element. The second resilient element is connected to the movable portion and to the fixed portion. The first resilient element provides a first preload to the movable portion. The second resilient element provides a second preload to the movable portion. The direction of the second preload is parallel to the moving direction of the movable portion.

In some embodiments of the present disclosure, the optical system further includes a rotation shaft. The movable portion is movable relative to the fixed portion via the rotation shaft. The rotation shaft is disposed between the movable portion and the fixed portion.

In some embodiments of the present disclosure, the rotation shaft is fixedly connected to the movable portion to act as a fulcrum around which the movable portion rotates relative to the fixed portion.

In some embodiments of the present disclosure, the contact member is movable relative to the fixed portion. The contact member is fixedly connected to the movable portion.

In some embodiments of the present disclosure, the contact member has a ball-shaped structure.

In some embodiments of the present disclosure, the piezoelectric element drives the contact member to perform a biaxial rotational movement.

In some embodiments of the present disclosure, the optical system further includes a support assembly connected to the movable portion and to an external circuit.

In some embodiments of the present disclosure, the support assembly comprises a first resilient element, including a resilient cantilever that has an elastic structure.

In some embodiments of the present disclosure, the first resilient element is connected to the optical module.

In some embodiments of the present disclosure, the first resilient element is a circuit assembly. The optical module is electrically connected to the external circuit via the first resilient element.

In some embodiments of the present disclosure, the optical system has a main axis that is parallel to an optical axis of the optical module. The optical module has an elongated structure when viewed along the main axis.

In some embodiments of the present disclosure, the support assembly, the optical module, and the driving assembly are aligned along a straight line when viewed along the main axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
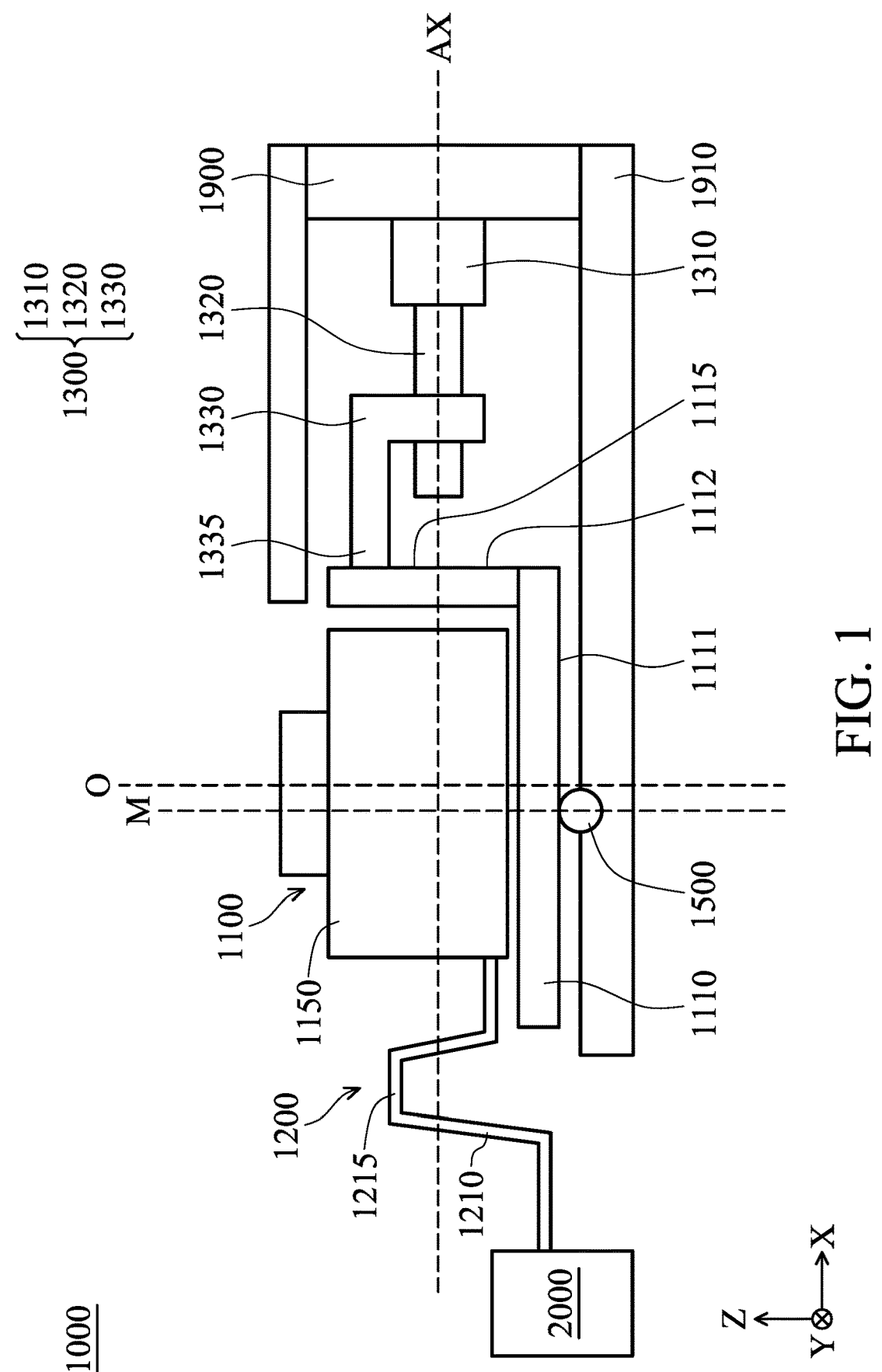
FIG. 1 is a schematic side view of the optical system, according to the first embodiment of the present disclosure.

An optical system of an embodiment in the present invention is described below. However, it should be easily understood that the embodiments in the present invention provide many suitable concepts of invention that can be widely employed in various specific fields. The particular embodiments disclosed herein only depict specific ways to utilize the present invention, and are not intended to be limiting the scope of the present invention.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the system including the features.

First, referring to FIG. 1, FIG. 1 is a schematic side view of the optical system 1000, according to the first embodiment of the present disclosure. As shown in FIG. 1, the optical system 1000 may mainly include a movable portion 1100, a support assembly 1200, a driving assembly 1300, a rotation shaft 1500, and a fixed portion 1900.

The movable portion 1100 is movable relative to the fixed portion 1900. In some embodiments, the movable portion 1100 may include a holder 1110. An optical module 1150 may be connected to the holder 1110, and be held onto the holder 1110. For example, the optical module 1150 may be a lens module that is able to take pictures or record videos, such as a compact camera module (CCM), but it is not limited thereto. By driving the optical module 1150 to move along with the movable portion 1100 relative to the fixed portion 1900, the shooting angle of the optical module 1150 may be broadened. The way that it moves will be described in detail below.

The support assembly 1200 is connected to the movable portion 1100 and to an external circuit 2000. In some embodiments, the support assembly 1200 includes a first resilient element 1210. The first resilient element 1210 includes a resilient cantilever 1215 that has an elastic structure. The first resilient element 1210 may be resiliently deformed when the movable portion 1100 moves relative to the fixed portion 1900. In some embodiments, the first resilient element 1210 may provide a preload to the holder 1110. The details regarding the preload will be described below.

In some embodiments, the first resilient element 1210 may be a circuit assembly, for example, a flexible printed circuit (FPC), and the first resilient element 1210 may be electrically connected to the external circuit 2000. In some embodiments according to the present disclosure, the external circuit 2000 is affixed relative to the fixed portion 1900, so the first resilient element 1210 that is connected to the external circuit 2000 may be interpreted as connected to the fixed portion 1900. In such embodiments, one end of the first resilient element 1210 is connected to the external circuit 2000, and the other end of the first resilient element 1210 may be connected to the optical module 1150 on the movable portion 1100. Therefore, the optical module 1150 is electrically connected to the external circuit 2000 via the first resilient element 1210. The optical module 1150 may receive power and/or signals from the external circuit 2000 via the first resilient element 1210.

The driving assembly 1300 drives the movable portion 1100 to move relative to the fixed portion 1900. The driving assembly 1300 is in contact with the movable portion 1100. The driving assembly 1300 drives the movable portion 1100 to move relative to the fixed portion 1900 by pushing the movable portion 1100. In some embodiments, the driving assembly 1300 may be a smooth impact drive mechanism (SIDM) or any mechanism that is suitable for providing a driving force.

Specifically, the driving assembly 1300 may include a piezoelectric element 1310, a transmission member 1320, and a contact member 1330. The piezoelectric element 1310 is disposed at the fixed portion 1900. For example, the piezoelectric element 1310 may be disposed at the housing 1910 of the fixed portion 1900. The transmission member 1320 is connected to the piezoelectric element 1310, extending toward the movable portion 1100 from the piezoelectric element 1310. As shown in FIG. 1, the transmission member 1320 may have a structure of a stick for transmitting a power that is output by the piezoelectric element 1310. The contact member 1330 is connected to the transmission member 1320. For example, the contact member 1330 may be sleeved onto the stick structure of the transmission member 1320. The transmission member 1320 may transmit the power that is output by the piezoelectric element 1310 to the contact member 1330, so that the contact member 1330 may move relative to the piezoelectric element 1310.

As shown in FIG. 1, the other end of the contact member 1330, that is opposite from the end that is sleeved onto the transmission member 1320, has a contact end 1335. The contact end 1335 may be in direct contact with the holder 1110 of the movable portion 1100, but not connected to the holder 1110. Thus, the contact member 1330 is still movable relative to the movable portion 1100. The contact member 1330 receives the power from the piezoelectric element 1310, pushes the holder 1110 through the contact end 1335, and provides the driving force to the movable portion 1100, so that the movable portion 1100 is movable relative to the fixed portion 1900. In some embodiments, the contact member 1330 may have a rod structure or any other structure that is good for transmitting the power. In the first embodiment shown in FIG. 1, the driving assembly 1300 and the holder 1110 are in surface contact.

As shown in FIG. 1, the optical system 1000 has a main axis M. The optical module 1150 has an elongated structure when viewed along the main axis M. The support assembly 1200, the optical module 1150, and the driving assembly 1300 may be aligned along a straight line in the direction of the first axis AX when viewed along the main axis M. In some embodiments, the first axis AX may be perpendicular to the main axis M. In some embodiments, the main axis M may be parallel to the optical axis O of the optical module 1150, wherein the optical axis O passes through the center of the optical module 1150. The main axis M may or may not overlap the optical axis O. It is not limited to the embodiments shown in the present disclosure.

The rotation shaft 1500 is disposed between the movable portion 1100 and the fixed portion 1900. For example, the rotation shaft 1500 may be disposed between the holder 1110 and the housing 1910. In some embodiments, the center of the rotation shaft 1500 is disposed on the main axis M. The movable portion 1100 moves relative to the fixed portion 1900 via the rotation shaft 1500. Specifically, the rotation shaft 1500 is affixed to the holder 1110 of the movable portion 1100. The rotation shaft 1500 acts as a fulcrum around which the movable portion 1100 rotates relative to the fixed portion 1900, so that the movable portion 1100 may rotate around the rotation shaft 1500 relative to the fixed portion 1900 after being pushed by the driving assembly 1300.

As shown in FIG. 1, the holder 1110 of the movable portion 1100 may have a bottom surface 1111 and a side surface 1112. In the optical system 1000 of the first embodiment of the present disclosure, the bottom surface 1111 faces the rotation shaft 1500, and the side surface 1112, that is perpendicular to the bottom surface 1111, faces the driving assembly 1300. In the first embodiment, the side surface 1112 serves as the contact surface 1115 of the holder 1110, receiving the driving force, that comes from the driving assembly 1300, from the right side (in X direction) of the drawing.

Figure 2:
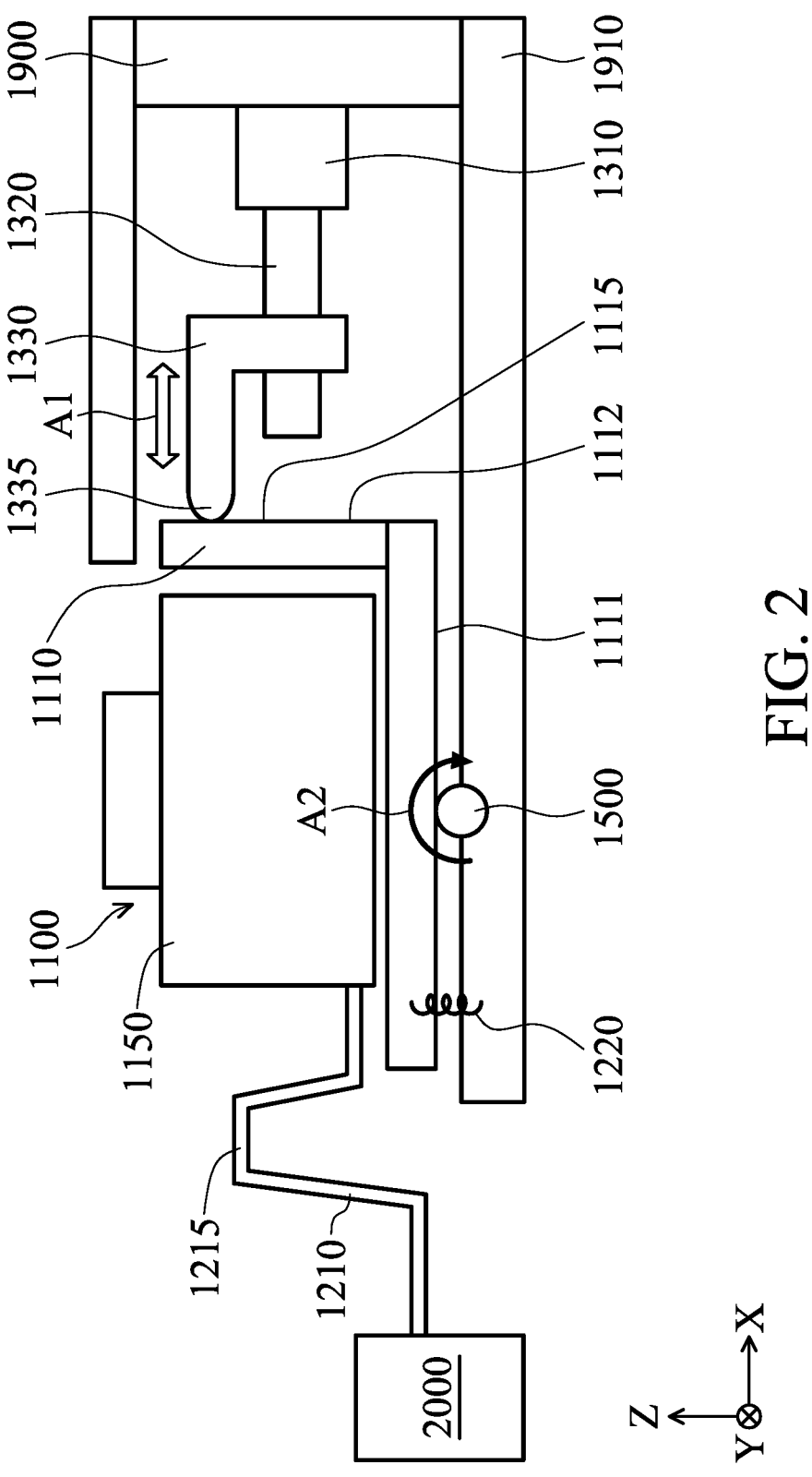
FIG. 2 is a schematic side view of the optical system, according to the second embodiment of the present disclosure.

Referring to FIG. 2, FIG. 2 is a schematic side view of the optical system 1001, according to the second embodiment of the present disclosure. The optical system 1001 is similar to the optical system 1000 shown in FIG. 1. The common features shared by the optical system 1001 and the optical system 1000 will not be repeated. Only the distinctive features will be described.

As shown in FIG. 2, in the second embodiment, the support assembly 1200 of the optical system 1001 may further include a second resilient element 1220. The second resilient element 1220 is disposed between the movable portion 1100 and the fixed portion 1900. For example, the second resilient element 1220 may be disposed between the holder 1110 and the housing 1910. In addition, the number and the position of the second resilient element 1220 are not limited to those disclosed in the present disclosure. For example, the support assembly 1200 may include two of the second resilient elements 1220 that are disposed on opposite sides of the rotation shaft 1500, respectively.

In some embodiments, the second resilient element 1220 may have a structure of a spring. In some embodiments, the first resilient element 1210 may provide a first preload to the holder 1110, and the second resilient element 1220 may provide a second preload to the holder 1110. The first resilient element 1210 and the second resilient element 1220 may resilient deform when the contact member 1330 of the driving assembly 1300 pushes the holder 1110 toward the left side of the drawing (in −X direction) in the moving direction A1. At this time, the holder 1110 rotates counter-clockwise opposite to the rotating direction A2 around the rotation shaft 1500. When the contact member 1330 moves away from the holder 1110 (that is, the contact member 1330 no longer pushes the holder 1110) toward the right side of the drawing (in +X direction) in the moving direction A1, the holder 1110 is moved by the first preload of the first resilient element 1210 and/or the second preload of the second resilient element 1220. That is, the holder 1110 rotates clockwise in the rotating direction A2 around the rotation shaft 1500. At this time, the direction of the first preload of the first resilient element 1210 is parallel to the second preload of the second resilient element 1220. Both the directions of the first preload and the second preload are perpendicular to the moving direction A1.

As shown in FIG. 2, in the second embodiment, the contact end 1335 of the contact member 1330 may be in a hemispherical shape. In such embodiments, the driving assembly 1300 and the holder 1110 are in point contact. In some embodiments, the contact surface 1115 of the holder 1110 may have a concaved portion (not shown) that corresponds to the hemispherical contact end 1335, which ensures the contact between the driving assembly 1300 and the holder 1110.

Figure 3:
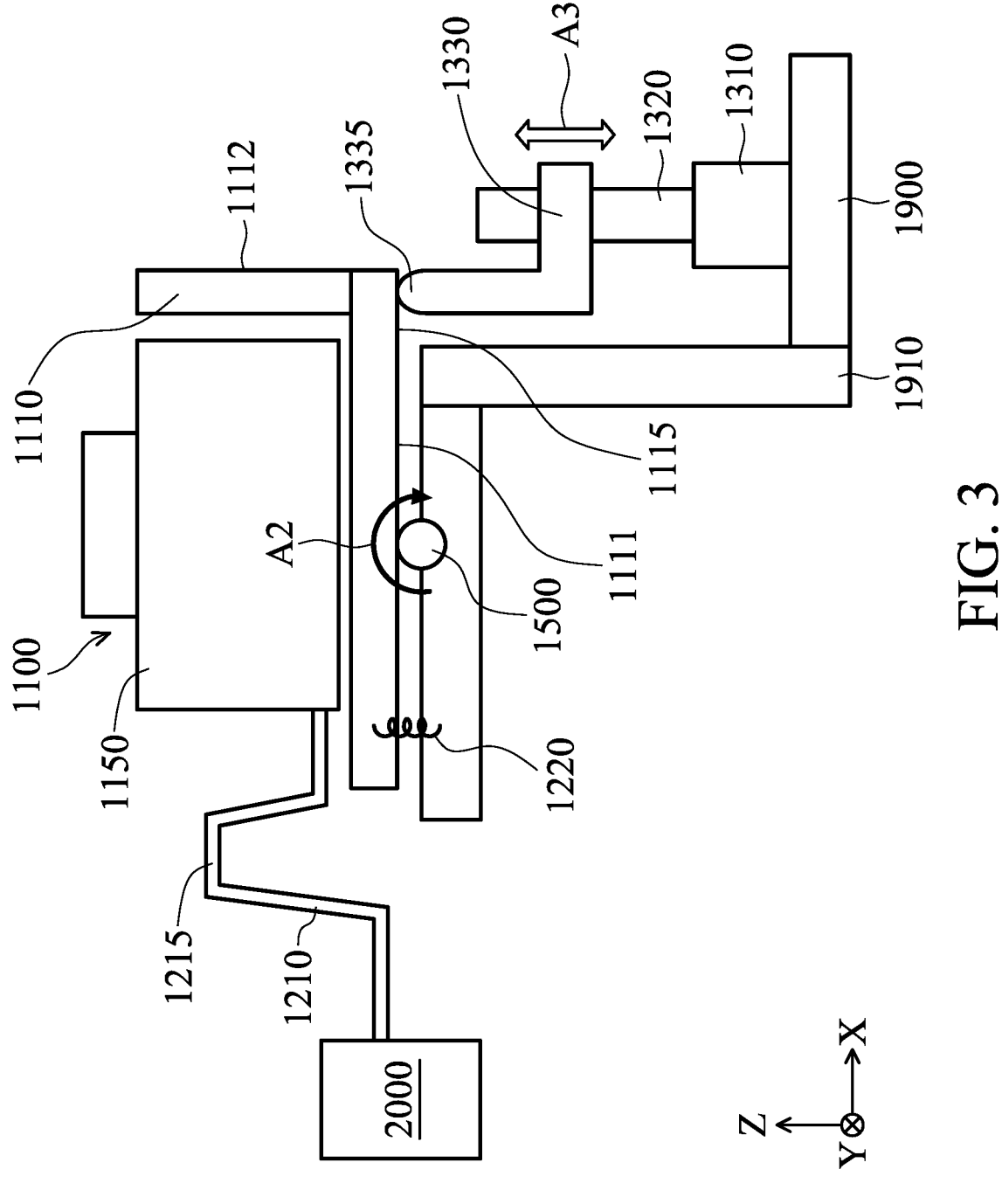
FIG. 3 is a schematic side view of the optical system, according to the third embodiment of the present disclosure.

Referring to FIG. 3, FIG. 3 is a schematic side view of the optical system 1002, according to the third embodiment of the present disclosure. The optical system 1002 is similar to the optical system 1000 shown in FIG. 1 and the optical system 1001 shown in FIG. 2. The common features shared by the optical system 1002 with the optical system 1001 or the optical system 1000 will not be repeated. Only the distinctive features will be described.

As shown in FIG. 3, in the third embodiment, the driving assembly 1300 is not aligned in a straight line with the first resilient element 1210 and the optical module 1150.

In the optical system 1002 of the third embodiment of the present disclosure, the bottom surface 1111 faces the rotation shaft 1500, and the side surface 1112, that is perpendicular to the bottom surface 1111, does not face the driving assembly 1300. In the third embodiment, the bottom surface 1111 serve as the contact surface 1115 of the holder 1110, receiving the driving force, that comes from the driving assembly 1300, from the lower side of the drawing (in Z direction).

In the third embodiments, the first resilient element 1210 and the second resilient element 1220 may resilient deform when the contact member 1330 of the driving assembly 1300 pushes the holder 1110 toward the upper side of the drawing (in +Z direction) in the moving direction A3. At this time, the holder 1110 rotates counter-clockwise opposite to the rotating direction A2 around the rotation shaft 1500. When the contact member 1330 moves away from the holder 1110 (that is, the contact member 1330 no longer pushes the holder 1110) toward the lower side of the drawing (in −Z direction) in the moving direction A1, the holder 1110 is moved by the first preload of the first resilient element 1210 and/or the second preload of the second resilient element 1220. That is, the holder 1110 rotates clockwise in the rotating direction A2 around the rotation shaft 1500. At this time, the direction of the first preload of the first resilient element 1210 is parallel to the second preload of the second resilient element 1220. Both the directions of the first preload and the second preload are parallel to the moving direction A3.

As mentioned above, in the optical systems (e.g. the optical system 1000, the optical system 1001, and the optical system 1002) provided by the present disclosure, the holder 1110 may rotate back and forth around the rotation shaft 1500 (i.e. a uniaxial rotation). In some embodiments, the holder 1110 may rotate back and forth around the rotation shaft 1500 in a range of ±30 degrees. Accordingly, the shooting angle of the optical module 1150, that is held by the holder 1110, may be broadened, while the image quality generated by the optical module 1150 may be maintained.

Figure 4:
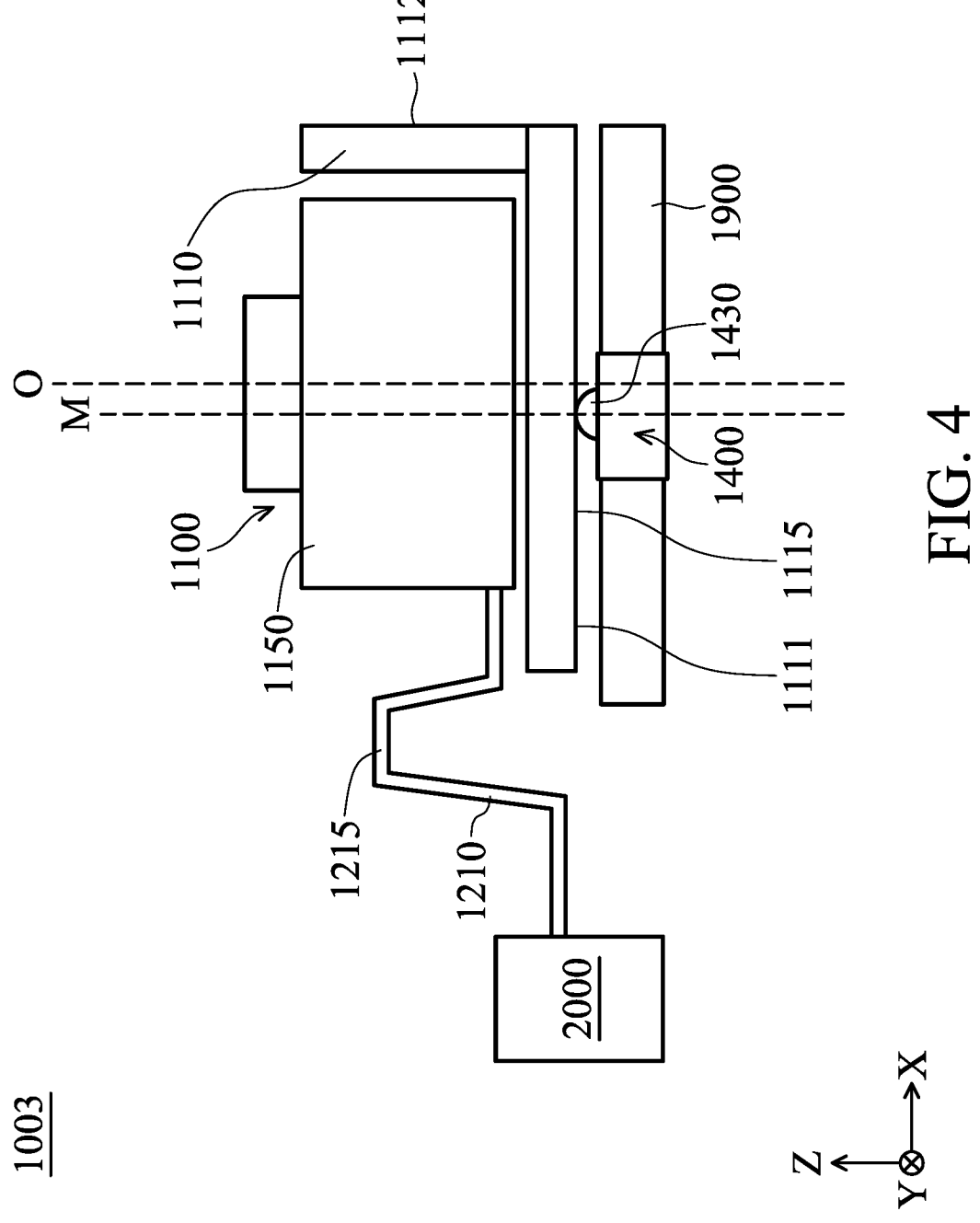
FIG. 4 is a schematic side view of the optical system, according to the fourth embodiment of the present disclosure.

Referring to FIG. 4, FIG. 4 is a schematic side view of the optical system 1003, according to the fourth embodiment of the present disclosure. The movable portion 1100, the support assembly 1200, and the fixed portion 1900 of the optical system 1003 are similar to those components illustrated in FIG. 1 to FIG. 3. The common features shared by the optical system 1003 with the optical system 1002, the optical system 1001 or the optical system 1000 will not be repeated. Only the distinctive features will be described.

The most distinctive feature between the optical system 1003 and the optical systems illustrated in FIG. 1 to FIG. 3 is that the optical system 1003 includes a driving assembly 1400 instead of a driving assembly 1300. The driving assembly 1400 drives the movable portion 1100 to move relative to the fixed portion 1900. The driving assembly 1400 is in contact with the movable portion 1100. The driving assembly 1400 drives the movable portion 1100 to perform a biaxial rotation relative to the fixed portion 1900 through a piezoelectric motor.

Figure 5A:
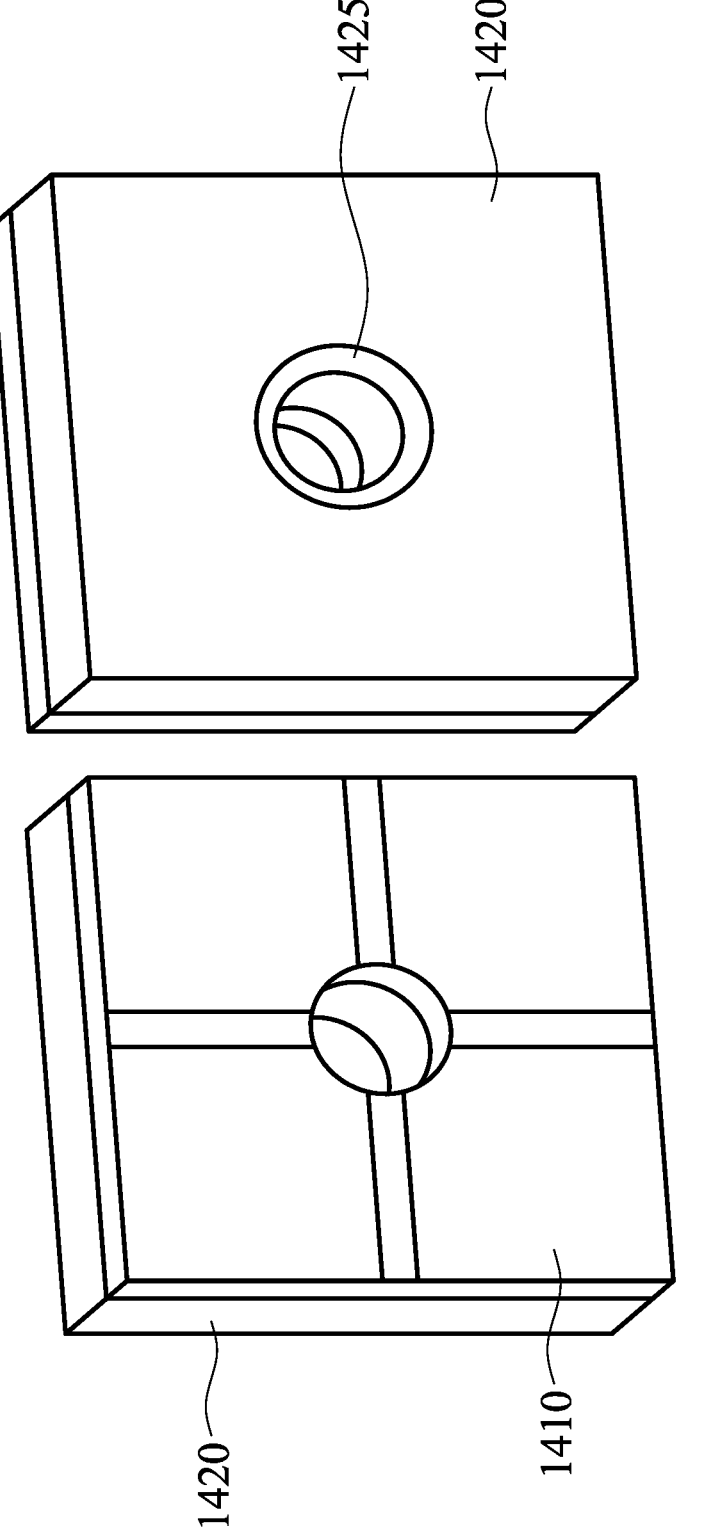
FIG. 5A is a schematic perspective view of the driving assembly, according to the fourth embodiment of the present disclosure, wherein the contact member is omitted. The left half of FIG. 5A shows the bottom side of the driving assembly, and the right half thereof shows the top side of the driving assembly.
Figure 5B:
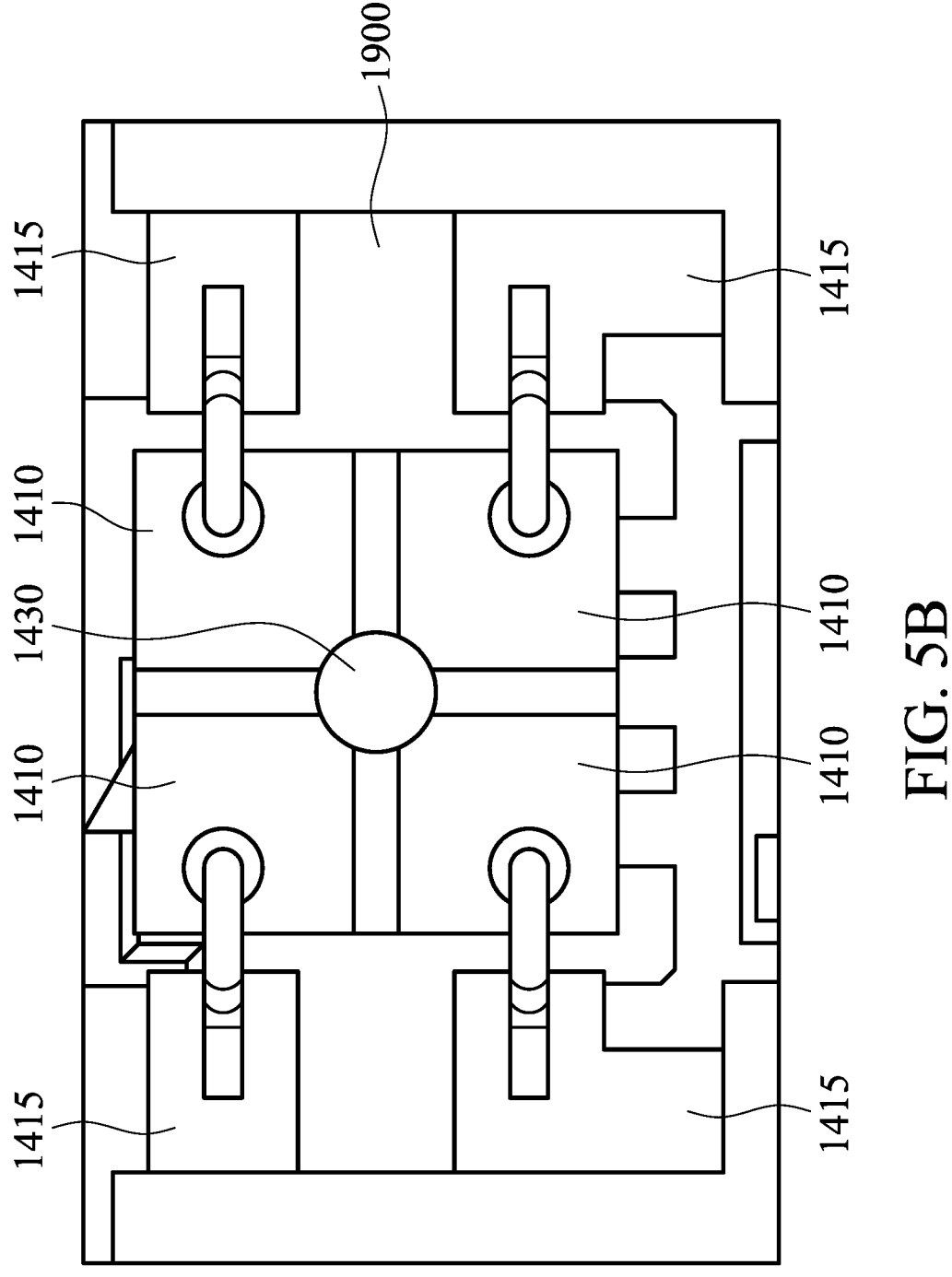
FIG. 5B is a schematic bottom view of the driving assembly in the optical system, according to the fourth embodiment of the present disclosure.

The structure of the driving assembly 1400 is described with reference to FIG. 4, FIG. 5A, and FIG. 5B. FIG. 5A is a schematic perspective view of the driving assembly 1400, according to the fourth embodiment of the present disclosure, wherein the contact member 1430 is omitted. The left half of FIG. 5A shows the bottom side of the driving assembly 1400, and the right half thereof shows the top side of the driving assembly 1400. FIG. 5B is a schematic bottom view of the driving assembly 1400 in the optical system 1003, according to the fourth embodiment of the present disclosure.

Specifically, the driving assembly 1400 may include at least one piezoelectric element 1410, a transmission member 1420, and a contact member 1430. In the fourth embodiment, the driving assembly 1400 includes four piezoelectric elements 1410. The piezoelectric elements 1410 and the transmission member 1420 are disposed at the fixed portion 1900. For example, the piezoelectric elements 1410 and the transmission member 1420 may be disposed on the housing 1910 of the fixed portion 1900. The transmission member 1420 is connected to the piezoelectric elements 1410 for transmitting the power output by the piezoelectric elements 1410.

As shown in FIG. 5B, each of the piezoelectric elements 1410 may be connected to one power supply 1415. The power supplies 1415 provide the electrical power that the piezoelectric elements 1410 require. The piezoelectric elements 1410 deform according to the signals provided by the power supplies 1415. Each of the power supplies 1415 may be independent from each other, providing signals of different phases to a respective piezoelectric element 1410. Because the signals received by each of the power supplies 1415 are in different phases, each power supply 1415 deforms differently. This makes the transmission member 1420 that is connected to the power supplies 1415 generate a wave-like motion. Users may control the transmission member 1420 to move to a certain position by controlling the signals.

As shown in FIG. 5A, there is a chamfered opening 1425 at the center of the transmission member 1420. The contact member 1430 of the driving assembly 1400 may be accommodated in the chamfered opening 1425. In the fourth embodiment, the contact member 1430 has a ball-shaped structure. The center of the contact member 1430 may be disposed on the main axis M of the optical system 1003.

In the optical system 1003 of the fourth embodiment of the present disclosure, the bottom surface 1111 faces the contact member 1430, and the side surface 1112, that is perpendicular to the bottom surface 1111, does not face the driving assembly 1400. In the fourth embodiment, the bottom surface 1111 serves as the contact surface 1115 of the holder 1110, receiving the driving force, that comes from the driving assembly 1400, from the lower side of the drawing (in Z direction).

In the fourth embodiment, the contact member 1430 is movable relative to the transmission member 1420 (i.e. the contact member 1430 is movable relative to the fixed portion 1900), and the contact member 1430 is fixedly connected to the movable portion 1100 (e.g. the contact member 1430 may be fixedly connected to the holder 1110). Since there is fiction force between the contact member 1430 and the transmission member 1420, the contact member 1430 may rotate biaxially around the X-axis and the Y-axis along with the wave-like motion of the transmission member 1420. This brings the holder 1110 to rotate biaxially as well.

As mentioned above, the holder 1110 performs a biaxial rotational movement, wherein the main axis M acts as the center of the rotation. Accordingly, the shooting angle of the optical module 1150, that is held by the holder 1110, may be further broadened, while the image quality generated by the optical module 1150 may be maintained.

In addition, other than the first resilient element 1210 (e.g. a resilient cantilever or a flexible printed circuit) and the second resilient element 1220 (e.g. a spring) mentioned above, one or more sets of magnetic elements may also be used to provide the preload that the holder 1110 needs. For example, a pair of magnetic elements that have opposite magnetic poles may be respectively disposed on the movable portion 1100 (e.g. the holder 1110) and on the fixed portion 1900 (e.g. the housing 1910). The magnetic attraction force between the magnetic elements may hold the relative positions of the movable portion 1100 and the fixed portion 1900.

In addition, the optical systems provided in the present disclosure may further facilitate mechanism miniaturization. For example, in the optical system 1000 and the optical system 1001 shown in FIG. 1 and FIG. 2, the support assembly 1200, the optical module 1150, and the driving assembly 1300 are aligned in a straight line (in X direction). This is good for miniaturization in Z direction. The optical system 1002 shown in FIG. 3 may be utilized to reduce the system size in X direction, wherein the driving assembly 1300 is placed in Z direction. The optical system 1003 shown in FIG. 4 may be utilized to reduce the system size in both X direction and Z direction.

As mentioned above, the driving assembly 1300 shown in FIG. 1 to FIG. 3 drives the holder 1110 that holds the optical module 1150 to perform a uniaxial rotation. The driving assembly 1400 shown in FIG. 4 drives the holder 1110 that holds the optical module 1150 to perform a biaxial rotation. As the holder 1110 rotates, the optical module 1150 obtains a broader shooting angle. These optical systems may be applied to the lens of a notebook computer. During a video conference, the lens can be controlled to follow people in the frame, so that people are always in the center of the screen. Alternatively, these optical systems may be applied to cameras of various electronic devices to facilitate panoramic photography.

In summary, the present disclosure provides embodiments of various optical systems, each includes a piezoelectric driving assembly (e.g. the driving assembly 1300 or the driving assembly 1400). Through the various embodiments, the shooting angle may be broadened using only one single lens. This not only lowers the cost for developing wide-angle lenses, but also reduces the distortion problems that occur on the edge of traditional wide-angle lenses.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:

a movable portion connected to an optical module;

a fixed portion, wherein the movable portion is movable relative to the fixed portion; and a driving assembly driving the movable portion to move relative to the fixed portion;

wherein the driving assembly is in contact with the movable portion;

wherein the driving assembly comprises:

a piezoelectric element disposed at the fixed portion;

a transmission member, connected to the piezoelectric element, and transmitting a power that is output by the piezoelectric element; and a contact member, connected to the transmission member, and being movable relative to the piezoelectric element;

wherein the contact member is movable relative to the fixed portion;

wherein the contact member is fixedly connected to the movable portion; and wherein the contact member has a ball-shaped structure.

2. The optical system as claimed in claim 1, wherein the contact member is movable relative to the movable portion.

3. The optical system as claimed in claim 2, wherein the contact member is in direct contact with the movable portion, providing a driving force to the movable portion.

4. The optical system as claimed in claim 3, wherein the contact member has a rod structure.

5. The optical system as claimed in claim 4, further comprising a support assembly connected to the movable portion and to an external circuit;

wherein the support assembly comprises:

a first resilient element, including a resilient cantilever that has an elastic structure;

wherein the first resilient element is connected to the optical module.

6. The optical system as claimed in claim 5, wherein the first resilient element is a circuit assembly, wherein the optical module is electrically connected to the external circuit via the first resilient element.

7. The optical system as claimed in claim 6, wherein the support assembly further comprises a second resilient element;

wherein the second resilient element is connected to the movable portion and to the fixed portion;

wherein the first resilient element provides a first preload to the movable portion;

wherein the second resilient element provides a second preload to the movable portion;

wherein the direction of the second preload is perpendicular to the moving direction of the movable portion.

8. The optical system as claimed in claim 6, wherein the support assembly further comprises a second resilient element;

wherein the second resilient element is connected to the movable portion and to the fixed portion;

wherein the first resilient element provides a first preload to the movable portion;

wherein the second resilient element provides a second preload to the movable portion;

wherein the direction of the second preload is parallel to the moving direction of the movable portion.

9. The optical system as claimed in claim 8, further comprising a rotation shaft, wherein the movable portion is movable relative to the fixed portion via the rotation shaft;

wherein the rotation shaft is disposed between the movable portion and the fixed portion.

10. The optical system as claimed in claim 9, wherein the rotation shaft is fixedly connected to the movable portion to act as a fulcrum around which the movable portion rotates relative to the fixed portion.

11. The optical system as claimed in claim 6, wherein the optical system has a main axis that is parallel to an optical axis of the optical module;

wherein the optical module has an elongated structure when viewed along the main axis;

wherein the support assembly, the optical module, and the driving assembly are aligned along a straight line when viewed along the main axis.

12. The optical system as claimed in claim 1, wherein the piezoelectric element drives the contact member to perform a biaxial rotational movement.

13. The optical system as claimed in claim 12, further comprising a support assembly connected to the movable portion and to an external circuit.

14. The optical system as claimed in claim 13, wherein the support assembly comprises a first resilient element, including a resilient cantilever that has an elastic structure.

15. The optical system as claimed in claim 14, wherein the first resilient element is connected to the optical module.

16. The optical system as claimed in claim 13, wherein the support assembly comprises a first resilient element that is a circuit assembly, wherein the optical module is electrically connected to the external circuit via the first resilient element.

* * * * *